United States Patent
Watanabe et al.

(10) Patent No.: US 8,728,700 B2
(45) Date of Patent: May 20, 2014

(54) REACTOR, TONER PRODUCTION METHOD, AND TONER

(75) Inventors: Junichi Watanabe, Shizuoka (JP); Kenichi Uehara, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/597,853

(22) Filed: Aug. 29, 2012

(65) Prior Publication Data

US 2013/0059249 A1  Mar. 7, 2013

(30) Foreign Application Priority Data

Sep. 5, 2011  (JP) .................................. 2011-192719

(51) Int. Cl.
  *B01J 19/00*  (2006.01)
  *G03G 9/087*  (2006.01)

(52) U.S. Cl.
  USPC ...................................... 430/137.13; 422/187

(58) Field of Classification Search
  CPC ............. B01J 2219/00006; B01J 14/00; B01J 2219/00103; G03G 9/1131; G03G 9/1133; G03G 9/1134
  USPC ...................................... 430/137.13; 422/187
  See application file for complete search history.

(56) References Cited

U.S. PATENT DOCUMENTS

| | | |
|---|---|---|
| 2008/0311504 A1 | 12/2008 | Hattori et al. |
| 2011/0033796 A1 | 2/2011 | Yamada et al. |
| 2011/0136052 A1 | 6/2011 | Watanabe et al. |

FOREIGN PATENT DOCUMENTS

| | | | |
|---|---|---|---|
| GB | 877271 | * | 9/1961 |
| JP | 60-231640 | | 11/1985 |
| JP | 63-109447 | | 5/1988 |
| JP | 63-225512 | | 9/1988 |
| JP | 07-060107 | | 3/1995 |
| JP | 10-015381 | | 1/1998 |
| JP | 11-133665 | | 5/1999 |
| JP | 2003-316074 | | 11/2003 |
| JP | 2005-010368 | | 1/2005 |
| JP | 2011-033911 | | 2/2011 |
| JP | 2011-123215 | | 6/2011 |

* cited by examiner

*Primary Examiner* — Hoa V Le
(74) *Attorney, Agent, or Firm* — Oblon, Spivak, McClelland, Maier & Neustadt, L.L.P.

(57) ABSTRACT

A reactor, which heats a slurry raw material including a solid component, including a reaction tube, wherein the slurry raw material is continuously fed from an end of the reaction tube relative to the central axial direction of the reaction tube so as to be flown toward another end of the reaction tube to be heated; and plural perforated plates arranged in the reaction tube so as to separate the inside of the reaction tube into plural compartments. The reactor satisfies the relations $(1/2)\cdot D' \leq D < D'$, and $0.2 \leq S/D' \leq 5.0$, wherein D represents the diameter of each of the perforated plates, D' represents the inner diameter of the reaction tube, and S represents the interval between any two adjacent perforated plates in the central axial direction of the reaction tube.

9 Claims, 3 Drawing Sheets

FIG. 1
FIG. 2
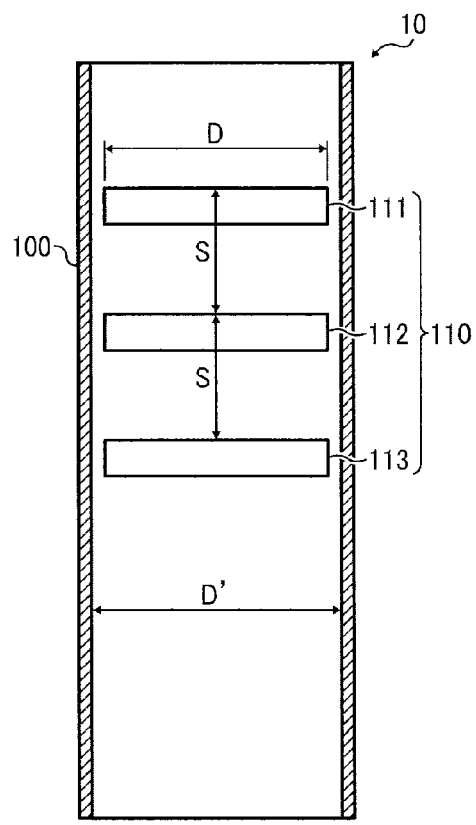
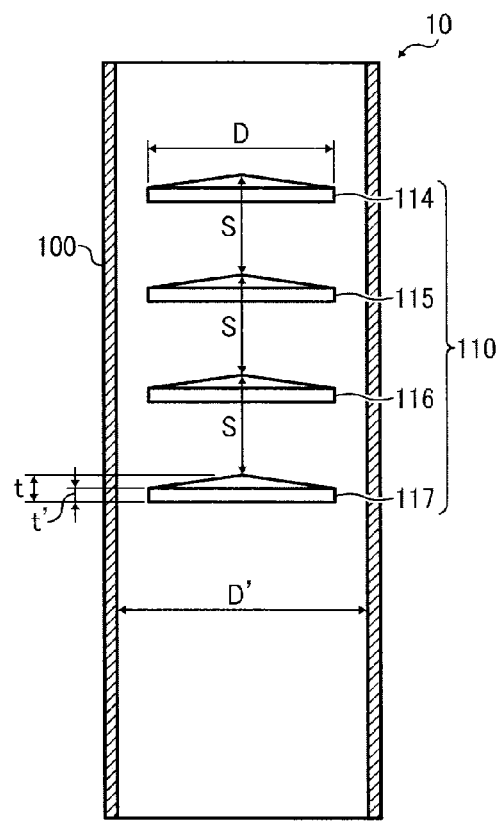

FIG. 4A
FIG. 4B
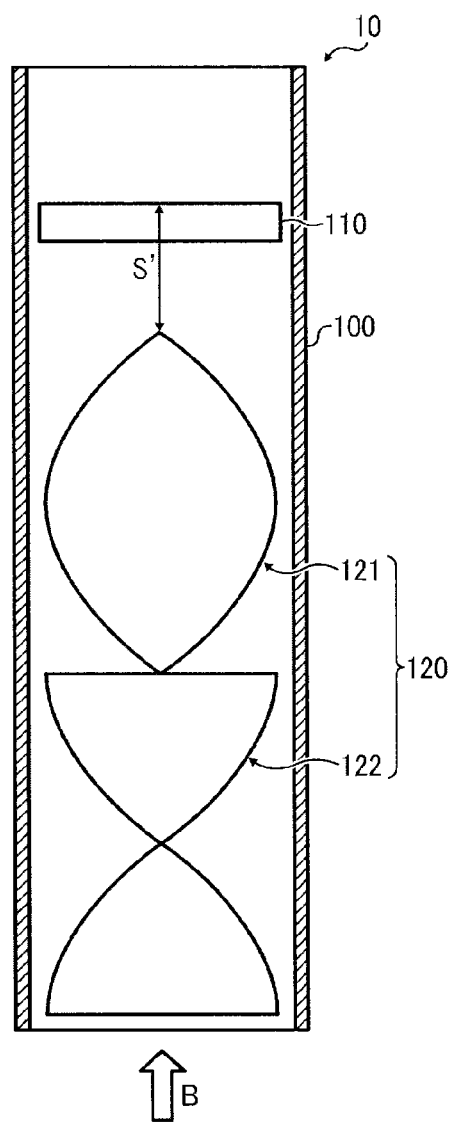
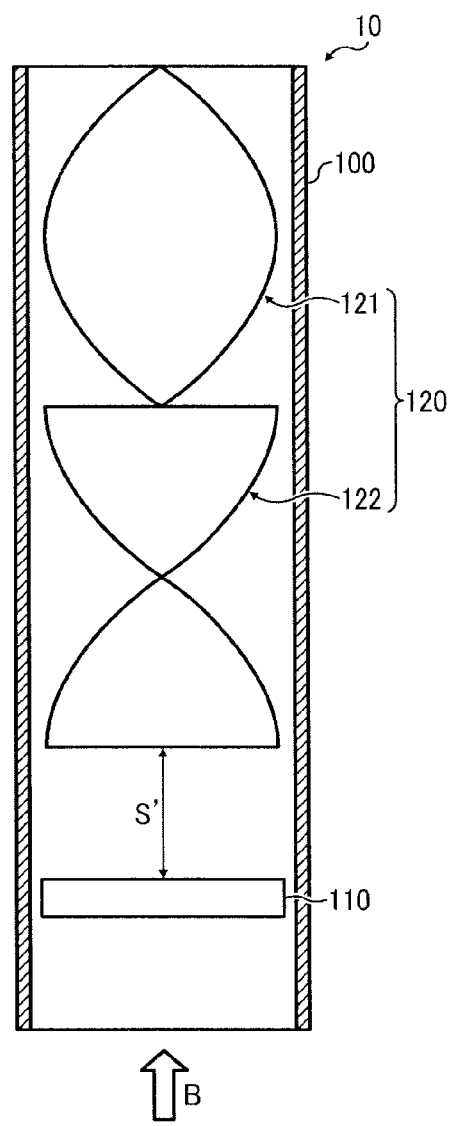

REACTOR, TONER PRODUCTION METHOD, AND TONER

CROSS-REFERENCE TO RELATED APPLICATIONS

This patent application is based on and claims priority pursuant to 35 U.S.C. §119 to Japanese Patent Application No. 2011-192719 filed on Sep. 5, 2011 in the Japan Patent Office, the entire disclosure of which is hereby incorporated herein by reference.

FIELD OF THE INVENTION

The present invention relates to a reactor to heat a raw material, which is a slurry including a solid component, to perform a reaction. In addition, the present invention also relates to a toner production method using the reactor, and a toner produced using the toner production method.

BACKGROUND OF THE INVENTION

Reactors used for chemical reactions are broadly classified into two types. The first type is a mixing-tank type reactor, which has a perfect mixing characteristic such that materials to be reacted (hereinafter referred to as raw materials) are fully mixed in a mixing tank so as to have the same composition and temperature. In general, the mixing-tank type reactors are separated into plural compartments and agitation is performed in each compartment. One example of the reactors is disclosed in an unexamined published Japanese patent application No. 2003-316074 (JP2003-316074A). The second type is a tube type reactor, in which raw materials are fed through a tube without agitation so as to be reacted.

Tube-type reactors have the advantage of having low costs because agitation is not necessary. However, tube-type reactors tend to cause a short-path problem in that when a filler such as catalysts is not present in the tube, the flow speed of the raw material in a central portion of the tube is faster than that in a portion near the inner wall of the tube, and therefore the residence time of the raw materials in the central portion of the tube shortens, resulting in decrease of the reaction rate. In order to obtain a sufficient residence time of the raw materials in such tube-type reactors, it is necessary to enlarge the reactors. In addition, tube-type reactors have another disadvantage such that it is difficult to allow a raw material to maintain steady flow in a tube due to change of the density of the heated raw material.

In order to keep the residence time of a raw material constant at any points on a cross-sectional surface of the tube perpendicular to the central axis of the tube, it is considered to use a technique using a perforated plate tower having plural perforate plates, which is disclosed in JP H10-015381A and which is used for gas-liquid reactions. It is known that when a fluid passes through a perforated plate having a constant aperture ratio, the flow speed of the fluid reaches a constant speed before and after the perforated plate. However, even when this technique is used, the flow speed of a raw material in a central portion of the tube is still faster than that in a portion near the wall of the tube.

In attempting to enhance the effect of the technique using a perforated plate tower, JP H07-060107A discloses a technique using a perforated plate which has larger aperture ratio in a portion of the plate near the wall of the tube than that in the central portion of the plate. However, this technique tends to cause a problem in that a raw material stays in several portions of the tube without being smoothly flown in the tube.

In particular, when a slurry including a solid component is used as the raw material, a deposition problem in that a large amount of deposition of the solid component is formed in the tube, and therefore it is necessary to frequently clean the tube is caused.

Recently, polymerized toners are used for electrophotography. Such polymerized toners are typically prepared by using such a reactor while using a slurry including a solid component as the raw material. For example, JP H11-133665 discloses a toner production method which uses a slurry including a liquid including an organic solvent and an aqueous medium, and a solid component including a polyester prepolymer having an isocyanate group and which performs a polymerization process in which the prepolymer and an amine are subjected to a polyaddition reaction in the liquid.

Conventional polymerized toner production methods include heating raw materials to polymerize a polyester resin having a desired molecular weight distribution, which is used as a binder resin of the toner, and to prepare a toner having a good combination of low temperature fixability and offset resistance.

Although the heating process of the conventional polymerized toner production methods can be easily used for the polycondensation reaction for forming a polyester, the methods cannot be easily used for a reaction of a slurry including a liquid including an organic solvent and an aqueous medium, and a solid component unless various production conditions are properly controlled. Namely, it is necessary to carefully optimize the conditions such as reaction temperature and maturing temperature when preparing a polymer.

For these reasons, the inventors recognized that there is a need for a toner production method using a reactor, which can prepare a polymerized toner without causing the short path problem and the deposition problem, and without specifying the heating temperature in detail, even when a slurry including a solid component is used as the raw material.

BRIEF SUMMARY OF THE INVENTION

As an aspect of the present invention, a reactor is provided which heats a slurry raw material including a solid component and which includes a reaction tube, wherein the slurry raw material is continuously fed from one end of the reaction tube relative to the central axis direction of the reaction tube so as to be flown toward another end of the reaction tube to be heated; plural perforated plates separating the inside of the reaction tube into plural compartments in the central axis direction of the reaction tube. The reactor satisfies the following relations:

$$(1/2) \cdot D' \le D < D'; \text{ and}$$

$$0.2 \le S/D' \le 5.0,$$

wherein D represents the diameter of each of the perforated plates, D' represents the diameter of the inner surface of the reaction tube, and S represents the interval between any two adjacent perforated plates.

Some or all of the perforated plates can be replaced with one or more helical plates each including a rightward twisted plate and a leftward twisted plate, which are serially arranged in the reaction tube while displaced from each other at an angle of 90°. The length (L) of each of the rightward twisted plate and the leftward twisted plate in the raw material flowing direction is not less than (1/2)D' and not greater than D'. In this case, the reactor satisfies the following relations:

$$(1/2) \cdot D' \le D < D', (1/2) \cdot D' \le L \le D', \text{ and } 0.2 \le S/D' \le 5.0,$$

wherein D represents the diameter of each of the perforated plates, D' represents the inner diameter of the reaction tube, L represents the length of each of the rightward twisted plate and the leftward twisted plate in a direction perpendicular to the raw material flowing direction, and S represents the interval between any two adjacent perforated plates, any two adjacent helical plates, or any adjacent perforated plate and helical plate, in the central axial direction of the reaction tube.

In a reactor having only one helical plate and no perforated plate, the following relation is satisfied:

$$(1/2) \cdot D' \leq L \leq D'.$$

As another aspect of the present invention, a toner production method for producing toner particles including a binder resin is provided which includes dissolving or dispersing a toner component including at least a binder resin component, which includes a compound having an active hydrogen group and a polymer having a functional group reactive with the active hydrogen group, in an organic solvent to prepare a first liquid; emulsifying or dispersing the first liquid in an aqueous medium to prepare a second liquid; partially or completely removing the organic solvent from the second liquid to prepare a modified second liquid; and heating the modified second liquid by feeding the modified second liquid through the reactor mentioned above to prepare a third liquid including the toner particles including the binder resin.

As yet another aspect of the present invention, a toner is provided which includes toner particles including at least a binder resin, wherein the toner particles are prepared by the toner production method mentioned above.

The aforementioned and other aspects, features and advantages will become apparent upon consideration of the following description of the preferred embodiments taken in conjunction with the accompanying drawings.

BRIEF DESCRIPTION OF THE SEVERAL VIEWS OF THE DRAWINGS

FIG. 1 is a schematic cross-sectional view illustrating the main portion of an example of the reactor of the present invention;

FIG. 2 is a schematic cross-sectional view illustrating the main portion of another example of the reactor of the present invention;

FIGS. 4A and 4B are schematic cross-sectional views illustrating the main portions of other examples of the reactor of the present invention.

DETAILED DESCRIPTION OF THE INVENTION

Figure 3:
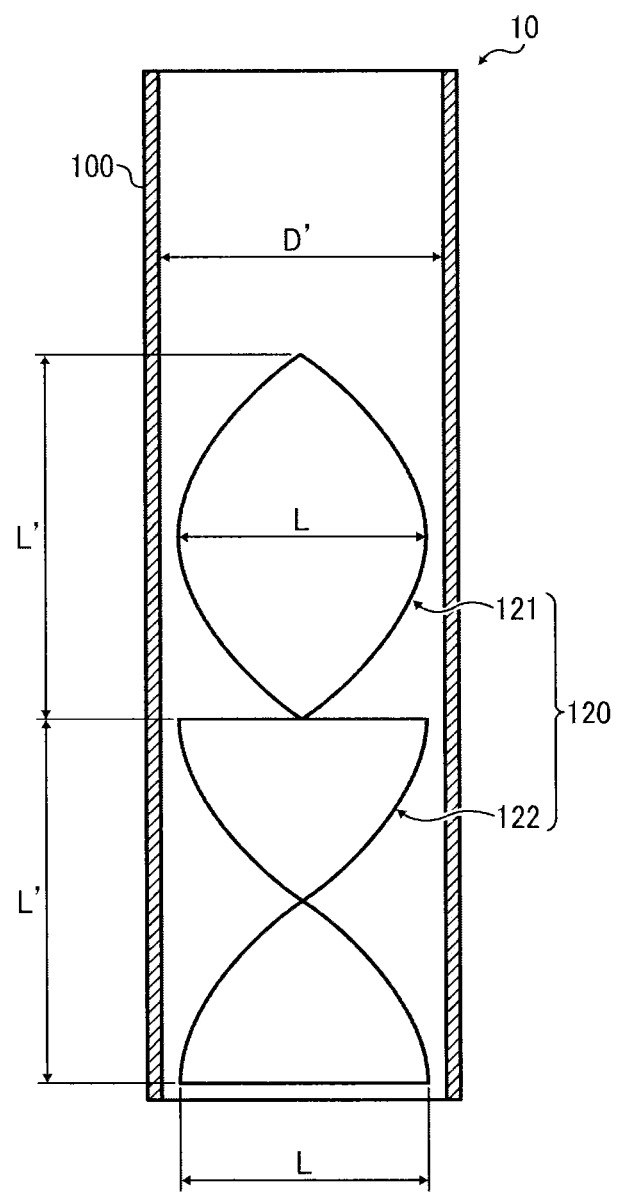
FIG. 3 is a schematic cross-sectional view illustrating the main portion of another example of the reactor of the present invention.

Initially, the reactor of the present invention will be described by reference to drawings.

FIG. 1 is a schematic cross-sectional view illustrating the main portion of an example of the reactor of the present invention. Referring to FIG. 1, a reactor 10 is a continuous tube type reactor including a reaction tube 100 (reaction vessel) in which a slurry raw material including a solid component is continuously fed from an end (an upper end in FIG. 1) thereof so as to flow in a direction of a central axis of the reaction tube (i.e., vertically in FIG. 1) while receiving heat from the reaction tube. The reactor 10 further includes plural disc-shaped perforated plates 110 (111, 112 and 113), each of which has multiple through holes extending in the thickness direction thereof, to separate the inside of the reaction tube 100 into plural small compartments. Hereinafter, the plural disc-shaped perforated plates 111, 112 and 113 are referred to as disc-shaped perforated plates 110 when the perforated plates (111, 112 and 113) are not distinguished from each other.

The shape of the through holes is not particularly limited. However, since the raw material includes a solid component, the diameter of the holes is needed to be sufficiently large enough to transmit the particles of the solid component, thereby preventing occurrence of a clogging problem in that the holes are clogged with the particles. The same is true for other examples mentioned later. For example, when the raw material is a slurry including toner particles, the diameter of the through holes of the perforated plates 110 is preferably not less than 10 mm.

When the diameter of the perforated plates 110 is D and the inner diameter of the reaction tube 100 is D' as illustrated in FIG. 1, the diameter D of the perforated plates 110 is preferably not less than D'/2 so that the raw material has a similar residence time at any points on the cross-sectional surface of the reaction tube 100 perpendicular to the central axis of the reaction tube. When the diameter D of the perforated plates 110 is less than D'/2, the effect of the perforated plates 110 cannot be satisfactorily produced. In addition, since the diameter D of the perforated plates 110 is set so as to be less than the inner diameter D' of the reaction tube 100 (i.e., D<D'), occurrence of the deposition problem in that deposition is formed in the vicinity of the inner wall of the reaction tube 100, in which the flow speed of the raw material is relatively slow compared to the central portion of the reaction tube, can be prevented. Further, the diameter D of the perforated plates 110 and the inner diameter D' of the reaction tube 100 preferably satisfy the following relation:

$$D'/2 \leq D < 9D'/10, \text{ and}$$

more preferably satisfy the following relation:

$$D'/2 \leq D < 4D'/5.$$

In addition, the reactor 10 satisfies the following relation:

$$0.2 \leq S/D' \leq 5.0,$$

wherein S represents the interval between two adjacent perforated plates 110 in the raw material flowing direction, and D' represents the inner diameter of the reaction tube 100.

When the reactor 10 satisfies the relation, the residence time of the raw material can be equalized better at any points on the cross-sectional surface of the reaction tube 100 perpendicular to the central axis of the reaction tube. When the ratio S/D' is less than 0.2, the raw material passing through one of the perforated plates 110 reaches the next perforated plate before the flown raw material spreads in the reaction tube 100. Therefore, the residence time uniforming effect can be hardly produced, and in addition stagnation points of the raw material are formed in the reaction tube 100. In contrast, when the ratio S/D' is greater than 5.0, the residence time uniforming effect can be hardly produced. In order to securely produce the residence time uniforming effect, the ratio S/D' is preferably not less than 0.2 and not greater than 3.0, and more preferably not less than 0.5 and not greater than 2.0.

The position of the first perforated plate (i.e., the start position of the perforated plates 110) in the raw material flowing direction is not particularly limited. However, the position of the first perforated plate 111 is preferably as close as possible to the entrance of the reaction tube 100 to straighten flow of the raw material fluid, which tends to have turbulent flow because the raw materials have been fed into the reaction tube at different speeds.

The reaction tube 100 of the reactor 10 is preferably set vertically, and the raw material slurry including a solid material is flown from the lower portion of the tube to the upper potion thereof or vice versa. It is not preferable to flow the raw material slurry horizontally or from a direction oblique to the central axis of the reaction tube 100 because deposition tends to be easily formed on the inner wall of the reaction tube 100.

FIG. 2 is a schematic cross-sectional view illustrating the main portion of another example of the reactor of the present invention. The reactor 10 satisfies the above-mentioned relations, $D'/2 \leq D < D'$, and $0.2 \leq S/D' \leq 5.0$. In addition, the reactor 10 has plural perforated plates 110 (114-117), each of which has a shape such that the upper surface of the plate is slanted from the center thereof toward the outer edge thereof, i.e., the outer edge of the plate has a thickness (t') less than a thickness (t) of the center thereof (i.e., t'<t). By forming such a slanting surface on the perforated plates 110, it becomes possible that the raw material (such as a liquid or a slurry) receives a relatively high shearing force in the vicinity of the center of the perforated plates 110 while receiving a relatively low shearing force in the vicinity of the wall of the reaction tube 110. Therefore, the flow speed of the raw material is decreased at the central portion of the reaction tube 110 while increased in the vicinity of the wall of the reaction tube 110, thereby making it possible to keep the residence time of the raw material substantially constant at any points on the cross-sectional surface of the tube perpendicular to the central axis of the tube, resulting in prevention of occurrence of the above-mentioned short path problem. In this regard, as the thickness (t) of the center of the perforated plates 110 increases and the thickness (t') of the outer edge of the plates decreases, the residence time uniforming effect can be enhanced.

In the reaction tube 100 illustrated in FIG. 2, even when a slurry including a solid component is used as the raw material and deposition is formed on the slanting surface of the perforated plates 110, the deposition slips from the slanting surface, and therefore occurrence of the deposition problem can be securely prevented.

In the reaction tube 100 illustrated in FIG. 2, the interval S between two adjacent perforated plates is the length from the top of the center of a perforated plate to the top of the center of the adjacent perforated plate as illustrated in FIG. 2.

FIG. 3 is a schematic cross-sectional view illustrating the main portion of another example of the reactor of the present invention. As illustrated in FIG. 3, some or all of the plural perforated plates 100 can be replaced with a helical plate 120 including a rightward twisted plate 121 and a leftward twisted plate 122, which are serially arranged so as to be displaced from each other at an angle of 90°. In the reactor 10 illustrated in FIG. 3, all of the plural perforated plates 100 are replaced with the helical plate 120.

The helical member 120 can prevent occurrence of the deposition problem because of the structure thereof. In addition, the helical member 120 can keep the residence time of the raw material substantially constant at any points on the cross-sectional surface of the reaction tube perpendicular to the central axis of the reaction tube, resulting in prevention of occurrence of the above-mentioned short path problem.

In this regard, when the twisting angle of the helical plate is too low, the residence time uniforming effect is small. In contrast, it is difficult to prepare a helical plate having a twisting angle of higher than 180°. Therefore, the twisting angle is preferably from 90° to 180°, and is more preferably closer to 180°.

In addition, as the number of the perforated plates 110 replaced with the helical plate 120 increases, the residence time uniforming effect can be enhanced.

The helical plate 120 (121 and 122) preferably satisfies the following relation:

$$D'/2 \leq L \leq D',$$

wherein L represents the length of the helical plate 120 in the direction perpendicular to the flow direction of the raw material, and D' represents the inner diameter of the reaction tube 100.

It is more preferable that $L=D'$. When the length L is not equal to the inner direction D' of the reaction tube (i.e., when a space is present between the inner surface of the reaction tube 100 and the outer edge of the helical plate), deposition tends to be formed in the reaction tube.

In addition, the helical plate 120 (121 and 122) preferably satisfies the following relation:

$$1.5L \leq L',$$

wherein L' represents the length of the helical plate 120 in the flow direction of the raw material, and L represents the length of the helical plate 120 in the direction perpendicular to the flow direction of the raw material.

When the above-mentioned relation is satisfied, occurrence of the deposition problem can be securely prevented. When the length L' is longer than 3.0L, the residence time uniforming effect is hardly produced. In addition, it is difficult to prepare a helical plate whose length L' in the flow direction of the raw material is too short. Therefore, the length L' of the helical plate 120 in the flow direction of the raw material is preferably form 1.5L to 3.0L and more preferably from 1.5L to 2.0L.

The helical plate 120 (121 and 122) is preferably as thin as possible as long as the helical plate is not damaged or deformed under the weight thereof, because occurrence of the deposition problem can be securely prevented.

FIGS. 4A and 4B are schematic cross-sectional views illustrating the main portions of other examples of the reactor of the present invention. Each of the reactors illustrated in FIGS. 4A and 4B includes the perforated plate 110, and the helical plate 120 including the rightward twisted plate 121 and the leftward twisted plate 122. As illustrated in FIGS. 4A and 4B, the perforated plate 110 may be located on a downstream or upstream side of the reaction tube 100 from the helical plate 120 (121 and 122) relative to a raw material flow direction B. In this regard, the interval S' between the perforated plate 110 and the adjacent helical plate 121 or 122 in the raw material flow direction is defined as the interval between the top of the center of the upper surface of the perforated plate 110 and the upper end of the upper helical plate 121 in the reactor illustrated in FIG. 4A, and the interval between the lower end of the lower helical plate 122 and the top of the center of the upper surface of the perforated plate 110 in the reactor illustrated in FIG. 4B. Similarly to the reactors illustrated in FIGS. 1 and 2, the reactors illustrated in FIGS. 4A and 4B preferably satisfy the following relation:

$$0.2 \leq S'/D' \leq 5.0,$$

wherein S' is the interval defined above, and D' represents the inner diameter of the reaction tube 100.

Next, the toner production method of the present invention, which uses the reactor 10 mentioned above, will be described.

The toner production method of the present invention includes the following steps:

(1) a first step in which a toner constituent material including at least a binder resin component including a compound having an active hydrogen group, and a polymer having a functional group reactive with the active hydrogen group of the compound is dissolved or dispersed in an organic solvent to prepare a first liquid;

(2) a second step in which the first liquid is emulsified or dispersed in an aqueous medium to prepare a second liquid; and (3) a third step in which a modified second liquid which is a liquid obtained by removing the organic solvent from the second liquid, or an intermediate liquid obtained by partially removing the organic solvent from the second liquid (i.e., the second liquid in a process of removing the organic solvent therefrom) is heated to prepare a third liquid.

In the toner production method, the third step is performed by passing the modified second liquid through one of the reactors mentioned above.

The first liquid preferably has an acid value of from 2 to 30 mgKOH/g. When the acid value of the first liquid is less than 2 mgKOH/g, the resultant toner tends to have poor adhesiveness to recording papers. In contrast, when the acid value is greater than 30 mgKOH/g, the resultant toner tends to have a broad particle diameter distribution.

By performing heating in the third step, the reaction of the functional group of the polymer with the active hydrogen group of the compound can be accelerated.

Specific examples of the active hydrogen group include hydroxyl groups (alcoholic hydroxyl groups and phenolic hydroxyl groups), amino groups, carboxyl groups, and mercapto groups, but are not limited thereto. A compound having two or more of these groups can also be used. Among these groups, amino groups are preferable, because amino groups can form urea-modified polyesters by reacting with a polyester prepolymer having an isocyanate group, which is used as the polymer mentioned above.

Specific examples of the polymer having a functional group include polyesters, polyol resins, acrylic resins, and epoxy resins, which have a functional group such as isocyanate, epoxy, carboxyl, and chlorocarbonyl groups, but are not limited thereto. These polymers can be used alone or in combination. Among these polymers, polyester prepolymers having an isocyanate group are preferable because of producing urea-modified polyesters by reacting with a compound having an amino group.

A polyester prepolymer having an isocyanate group can be prepared by reacting a polyester having a hydroxyl group with a polyisocyanate at a temperature of from 40° C. to 140° C. In this reaction, an organic solvent can be optionally used.

The organic solvent is not particularly limited as long as the solvent is inactive with polyisocyanates. Specific examples of the organic solvent include aromatic solvents such as toluene, and xylene; ketones such as acetone, methyl ethyl ketone, and methyl isobutyl ketone; esters such as ethyl acetate; amides such as dimethylformamide, and dimethylacetamide; and ethers such as tetrahydrofuran. These solvents can be used alone or in combination.

A polyester having a hydroxyl group can be prepared by subjecting a polyalcohol and a polycarboxylic acid to a polycondensation reaction.

The polyalcohol is not particularly limited, and dihydric alcohols, tri- or more-hydric alcohols, and combinations of a dihydric alcohol and a tri- or more-hydric alcohol can be used. These polyalcohols can be used alone or in combination. Among these polyalcohols, dihydric alcohols, or combinations of a dihydric alcohol and a tri- or more-hydric alcohol can be preferably used.

Specific examples of such dihydric alcohols include alkylene glycols such as ethylene glycol, 1,2-propylene glycol, 1,3-propylene glycol, 1,4-butane diol, and 1,6-hexane diol; polyalkylene glycols such as diethylene glycol, triethylene glycol, dipropylene glycol, polyethylene glycol, polypropylene glycol, and polybutylene glycol; alicyclic dihydric alcohols such as 1,4-cyclohexane dimethanol, and hydrogenated bisphenol A; alkylene oxide (such as ethylene oxide, propylene oxide, and butylene oxide) adducts of the alicyclic dihydric alcohols mentioned above; bisphenol compounds such as bisphenol A, bisphenol F, and bisphenol S; and alkylene oxide (such as ethylene oxide, propylene oxide, and butylene oxide) adducts of the bisphenol compounds mentioned above.

Among these dihydric alcohols, alkylene glycols having 2 to 12 carbon atoms, and alkylene oxide adducts of bisphenol compounds are preferable, and alkylene oxide adducts of bisphenol compounds, and combinations of an alkylene oxide adduct of a bisphenol compound and an alkylene glycol having 2 to 12 carbon atoms are more preferable.

Specific examples of the tri- or more-hydric alcohols include aliphatic alcohols having three or more hydroxyl groups such as glycerin, trimethylol ethane, trimethylol propane, pentaerythritol, and sorbitol; polyphenols having three or more hydroxyl groups such as trisphenols (trisphenol PA, from Honshu Chemical Industry Co., Ltd.), phenol novolac, and cresol novolac; and alkylene oxide (such as ethylene oxide, propylene oxide, and butylene oxide) adducts of the polyphenols mentioned above.

The carboxylic acid is not particularly limited, and dicarboxylic acids and polycarboxylic acids having three or more carboxyl groups are used as the polycarboxylic acid. These carboxylic acids can be used alone or in combination. It is preferable to use dicarboxylic acids or combinations of a polycarboxylic having three or more carboxyl groups acid and a dicarboxylic acid as the polycarboxylic acid.

Specific examples of the dicarboxylic acids include alkylene dicarboxylic acids such as succinic acid, adipic acid, and sebacic acid; alkenylene dicarboxylic acids such as maleic acid, and fumaric acid; and aromatic dicarboxylic acids such as phthalic acid, isophthalic acid, terephthalic acid, and naphthalene dicarboxylic acids. Among these dicarboxylic acids, alkenylene dicarboxylic acids having from 4 to 20 carbon atoms, and aromatic dicarboxylic acids having from 8 to 20 carbon atoms are preferably used.

Specific examples of the polycarboxylic acids having three or more carboxyl groups include aromatic polycarboxylic acids such as trimellitic acid, and pyromellitic acid. Among these polycarboxylic acids, aromatic polycarboxylic acids having three or more carboxyl groups while having from 9 to 20 carbon atoms are preferable.

In the reaction of a polycarboxylic acid with a polyol, anhydrides or lower alkyl esters (such as methyl esters, ethyl esters, or isopropyl esters) of the polycarboxylic acids mentioned above can also be used as the polycarboxylic acid.

Suitable mixing ratio of a polyol to a polycarboxylic acid (i.e., an equivalence ratio [OH]/[COOH]) of the hydroxyl group of a polyol to the carboxyl group of a polycarboxylic acid) is from 2/1 to 1/1, preferably from 1.5/1 to 1/1, and more preferably from 1.3/1 to 1.02/1.

Specific examples of the polyisocyanates include, but are not limited thereto, aliphatic polyisocyanates (such as tetramethylene diisocyanate, hexamethylene diisocyanate, 2,6-diisocyanato methylcaproate, octamethylene diisocyanate, decamethylene diisocyanate, dodecamethylene diisocyanate, tetradecamethylene diisocyanate, trimethylhexane diisocyanate, and tetramethylhexane diisocyanate); alicyclic polyisocyanates (such as isophorone diisocyanate, and cyclohexylmethane diisocyanate); aromatic didicosycantes (such as tolylene diisocyanate, diphenylmethane diisocyanate, 1,5- naphthylene diisocyanate, diphenylene-4,4'-diisocyanate, 4,4'-diisocyanato-3,3'-dimethyldiphenyl, and 3-methyldiphenylmethane-4,4'-diisocyanate), and diphenylether-4,4'-diisocyanate; aromatic aliphatic diisocyanates (such as α, α, α', α'-tetramethyl xylylene diisocyanate); and isocyanurates (such as tris(isocyanatoalkyl)isocyanurate, and triisocyanatocycloalkylisocyanurate). These compounds can be used alone or in combination.

Blocked polyisocyanates, in which the polyisocyanates mentioned above are blocked with phenol derivatives, oximes, or caprolactams, can also be used instead of polyisocyanates.

When synthesizing a polyester prepolymer having an isocyanate group, suitable mixing ratio of a polyisocyanate to a polyester having a hydroxyl group (i.e., an equivalence ratio [NCO]/[OH] of the isocyanate group of a polyisocyanate (PIC) to the hydroxyl group of a polyester) is from 5/1 to 1/1, preferably from 4/1 to 1.2/1, and more preferably from 2.5/1 to 1.5/1.

The content of the unit obtained from a polyisocyanate in the polyester prepolymer having a polyisocyanate group is from 0.5% to 40% by weight, preferably from 1% to 30% by weight, and more preferably from 2% to 20% by weight.

By reacting a compound having an amino group with the polyester prepolymer, a urea-modified polyester resin can be prepared. Specific examples of the compound having an amino group include diamines, polyamines having three or more amino groups, amino alcohols, amino mercaptans, and amino acids.

Specific examples of the diamines include aromatic diamines (such as phenylene diamine, diethyltoluene diamine, and 4,4'-diaminodiphenyl methane); alicyclic diamines (such as 4,4'-diamino-3,3'-dimethyldicyclohexyl methane, diaminocyclohexane, and isophorone diamine); and aliphatic diamines (such as ethylene diamine, tetramethylene diamine, and hexamethylene diamine). Specific examples of the polyamines having three or more amino groups include diethylene triamine, and triethylene tetramine. Specific examples of the amino alcohols include ethanol amine, and hydroxyethyl aniline. Specific examples of the amino mercaptans include aminoethyl mercaptan, and aminopropyl mercaptan. Specific examples of the amino acids include amino propionic acid, and amino caproic acid.

Blocked amine compounds in which the amino group thereof is blocked, such as ketimine compounds and oxazoline compounds, can also be used instead of compounds having an amino group.

The mixing ratio of a polyester prepolymer having an isocyanate group to a compound having an amino group (i.e., an equivalence ratio [NCO]/[NHx] of the isocyanate group of a polyester prepolymer (A) to the amino group of an amine) is from 1/2 to 2/1, preferably from 1/1.5 to 1.5/1, and more preferably from 1/1.2 to 1.2/1.

When a polyester prepolymer and a compound having an amino group are reacted, a catalyst such as dibutyltin laurate, and dioctyltin laurate can be used.

The reaction of a polyester prepolymer having an isocyanate group with a compound having an amino group is generally performed at a temperature of from 0° C. to 150° C., and preferably from 40° C. to 98° C.

The reaction time of the reaction of a polyester prepolymer having an isocyanate group with a compound having an amino group is generally from 10 minutes to 40 hours, and preferably from 2 to 24 hours.

It is preferable to use a terminator (i.e., a molecular weight control agent) to terminate the reaction of a polyester prepolymer having an isocyanate group with a compound having an amino group (i.e., to control the molecular weight of the resultant urea-modified polyester).

Specific examples of such a molecular weight control agent include monoamines (such as diethyl amine, dibutyl amine, butyl amine, and lauryl amine), and blocked amines in which the monoamines mentioned above are blocked (such as ketimine compounds, and oxazoline compounds).

A urea-modified polyester, which is typically prepared by reacting a polyester prepolymer having an isocyanate group with a compound having an amino group at a temperature of from 0° C. to 140° C. optionally adding an organic solvent thereto, can be used as a binder resin. Specifically, when a first liquid is prepared in the toner preparation method of the present invention, a urea-modified polyester may be included as a binder resin component in the toner components, which are to be dissolved or dispersed in an organic solvent.

The organic solvent used for forming a urea-modified polyester is not particularly limited. Specific examples thereof include aromatic solvents such as toluene and xylene; ketones such as acetone, methyl ethyl ketone, and methyl isobutyl ketone; esters such as ethyl acetate; amides such as dimethylformamide, and dimethylacetamide; and ethers such as tetrahydrofuran. These solvents can be used alone or in combination.

The toner components may further include a colorant and/or a release agent.

Suitable materials for use as the colorant include known dyes and pigments. Specific examples of such dyes and pigments include carbon black, Nigrosine dyes, black iron oxide, NAPHTHOL YELLOW S, HANSA YELLOW 10G, HANSA YELLOW 5G, HANSA YELLOW G, Cadmium Yellow, yellow iron oxide, loess, chrome yellow, Titan Yellow, polyazo yellow, Oil Yellow, HANSA YELLOW GR, HANSA YELLOW A, HANSA YELLOW RN, HANSA YELLOW R, PIGMENT YELLOW L, BENZIDINE YELLOW G, BENZIDINE YELLOW GR, PERMANENT YELLOW NCG, VULCAN FAST YELLOW 5G, VULCAN FAST YELLOW R, Tartrazine Lake, Quinoline Yellow LAKE, ANTHRAZANE YELLOW BGL, isoindolinone yellow, red iron oxide, red lead, orange lead, cadmium red, cadmium mercury red, antimony orange, Permanent Red 4R, Para Red, Fire Red, p-chloro-o-nitroaniline red, Lithol Fast Scarlet G, Brilliant Fast Scarlet, Brilliant Carmine BS, PERMANENT RED F2R, PERMANENT RED F4R, PERMANENT RED FRL, PERMANENT RED FRLL, PERMANENT RED F4RH, Fast Scarlet VD, VULCAN FAST RUBINE B, Brilliant Scarlet G, LITHOL RUBINE GX, Permanent Red F5R, Brilliant Carmine 6B, Pigment Scarlet 3B, Bordeaux 5B, Toluidine Maroon, PERMANENT BORDEAUX F2K, HELIO BORDEAUX BL, Bordeaux 10B, BON MAROON LIGHT, BON MAROON MEDIUM, Eosin Lake, Rhodamine Lake B, Rhodamine Lake Y, Alizarine Lake, Thioindigo Red B, Thioindigo Maroon, Oil Red, Quinacridone Red, Pyrazolone Red, polyazo red, Chrome Vermilion, Benzidine Orange, perynone orange, Oil Orange, cobalt blue, cerulean blue, Alkali Blue Lake, Peacock Blue Lake, Victoria Blue Lake, metal-free Phthalocyanine Blue, Phthalocyanine Blue, Fast Sky Blue, INDANTHRENE BLUE RS, INDANTHRENE BLUE BC, Indigo, ultramarine, Prussian blue, Anthraquinone Blue, Fast Violet B, Methyl Violet Lake, cobalt violet, manganese violet, dioxane violet, Anthraquinone Violet, Chrome Green, zinc green, chromium oxide, viridian, emerald green, Pigment Green B, Naphthol Green B, Green Gold, Acid Green Lake, Malachite Green Lake, Phthalocyanine Green, Anthraquinone Green, titanium oxide, zinc oxide, lithopone and the like. These materials are used alone or in combination.

The content of the colorant in the toner is preferably from 1% to 15% by weight, and more preferably from 3% to 10% by weight of the toner. When the content of the colorant is less than 1% by weight, the coloring power of the toner tends to deteriorate. In contrast, when the content of the colorant is greater than 15% by weight, a problem in that the colorant is not satisfactorily dispersed in the resultant toner particles, thereby deteriorating the coloring power and/or the electric properties of the resultant toner tends to be caused.

Master batches, which are complexes of a colorant with a resin (binder resin), can be used as the colorant of the toner. Specific examples of the resin for use in the master batches include polyesters; styrene homopolymers and substituted styrene homopolymers such as polystyrene, poly-p-chlorostyrene, and polyvinyl toluene; copolymers of styrene (and substituted styrene) such styrene-p-chlorostyrene copolymers, styrene-propylene copolymers, styrene-vinyl toluene copolymers, styrene-vinyl naphthalene copolymers, styrene-methyl acrylate copolymers, styrene-ethyl acrylate copolymers, styrene-butyl acrylate copolymers, styrene-octyl acrylate copolymers, styrene-methyl methacrylate copolymers, styrene-ethyl methacrylate copolymers, styrene-butyl methacrylate copolymers, styrene-methyl $\alpha$-chloromethacrylate, styrene-acrylonitrile copolymers, styrene-vinyl methyl ketone copolymers, styrene-butadiene copolymers, styrene-isoprene copolymers, styrene-acrylonitrile-indene copolymers, styrene-maleic acid copolymers, and styrene-maleate copolymers; methacrylic homopolymers such as polymethyl methacrylate, and polybutyl methacrylate; vinyl homopolymers such as polyvinyl chloride, polyvinyl acetate, polyethylene, and polypropylene; and other resins such as epoxy resins, epoxy polyol resins, polyurethane resins, polyamide resins, polyvinyl butyral resins, polyacrylic acid, rosin, modified rosins, terpene resins, aliphatic or alicyclic hydrocarbon resins, aromatic petroleum resins, chlorinated paraffin, and paraffin waxes. These resins can be used alone or in combination.

Such master batches can be prepared by mixing a resin and a colorant, and kneading the mixture while applying a high shearing force thereto. In this case, an organic solvent can be added to enhance the interaction between the colorant and the resin. In addition, it is preferable to use a flushing method, in which an aqueous paste including a colorant and water is mixed with a resin dissolved in an organic solvent, the mixture is kneaded to transfer the colorant from the aqueous phase to the resin side (i.e., the oil phase), and then the organic solvent (and water, if desired) is removed from the kneaded mixture, because the resultant wet cake can be used without being dried. When performing the mixing and kneading process, dispersing devices capable of applying a high shearing force such as three roll mills can be preferably used.

The release agent for use in the toner is not particularly limited. Specific examples of the release agent include polyolefin waxes such as polyethylene waxes and polypropylene waxes; long-chain hydrocarbons such as paraffin waxes and SAZOL waxes; and waxes having a carbonyl group. These materials can be used alone or in combination. Among these materials, waxes having a carbonyl group are preferable.

Specific examples of the waxes having a carbonyl group include esters of polyalkanoic acids (such as carnauba waxes, montan waxes, trimethylolpropane tribehenate, pentaerythritol tetrabehenate, pentaerythritol diacetate dibehenate, glycerin tribehenate, and 1,18-octadecanediol distearate); polyalkanol esters (such as tristearyl trimellitate, and distearyl maleate); polyalkanoic acid amides (such as ethylenediamine dibehenyl amide); polyalkylamides (such as trimellitic acid tristearylamide); and dialkyl ketones (such as distearyl ketone). Among these waxes, esters of polyalkanoic acids are preferable.

The melting point of the release agent for use in the toner is generally from 40° C. to 160° C., preferably from 50° C. to 120° C., and more preferably from 60° C. to 90° C. When the melting point of the release agent is lower than 40° C., the high temperature preservability of the resultant toner tends to deteriorate. In contrast, when the melting point is higher than 160° C., the resultant toner tends to cause a cold offset problem in that a toner image adheres to a fixing roller when the toner image is fixed at a relatively low fixing temperature.

The release agent preferably has a melt viscosity of from 5 mPa·s to 1,000 mPa·s (i.e., 5 cps to 1,000 cps), and more preferably from 10 mPa·s to 100 mPa·s (i.e., 10 cps to 100 cps), at a temperature 20° C. higher than the melting point thereof. Release agents having a melt viscosity of higher than 1,000 mPa·s hardly produce the hot offset resistance improving effect and the low temperature fixability improving effect. The content of such a release agent in the toner is generally from 0% to 40% by weight, and preferably from 3% to 30% by weight, based on the total weight of the toner.

The solvent used for preparing the first liquid is not particularly limited as long as the binder resin and/or the precursor of the binder resin used for the first liquid can be dissolved therein. Specific examples of the solvent include aromatic solvents such as toluene, and xylene; ketones such as acetone, methyl ethyl ketone, and methyl isobutyl ketone; esters such as ethyl acetate; amides such as dimethylformamide, and dimethylacetamide; and ethers such as tetrahydrofuran. These solvents can be used alone or in combination.

When a precursor of a binder resin is used as a toner component, it is necessary that the organic solvent is inactive with the organic solvent.

The second liquid generally has a volume average particle diameter of from 3 μm to 8 μm, preferably from 3 μm to 7 μm, and more preferably from 4 μm to 7 μm. In addition, the ratio V/N of the volume average particle diameter (V) of the second liquid to the number average particle diameter (N) thereof is generally from 1.00 to 1.20, preferably from 1.00 to 1.17, and more preferably from 1.00 to 1.15. When the ratio falls in the range, the resultant toner has good developing property. Therefore, when the toner is used for image forming apparatus such as full color copiers, high quality images can be produced for a long period of time without causing a scattering problem in which the toner scatters around the developing device, and a background development problem in which the background of images is soiled with toner particles.

The volume average particle diameter and number average particle diameter of the second liquid can be measured with COULTER COUNTER TA-II or COULTER MULTISIZER (from Beckman Coulter Inc.).

The method for preparing the second liquid by dispersing the first liquid in an aqueous medium including a dispersant is not particularly limited, and dispersing method using a mechanical shearing force or the like can be used. In this regard, toner components other than a binder resin and/or a binder resin precursor may be added to the aqueous medium when the first liquid is added to the aqueous medium, but it is preferable to previously include the toner components in the first liquid. The aqueous medium includes water, and optionally includes an organic solvent compatible with water.

Specific examples of the organic solvent compatible with water include alcohols such as methanol, isopropyl alcohol, and ethylene glycol; dimethylformamide; tetrahydrofuran;

cellosolves such as methyl cellosolve; and lower ketones such as acetone and methyl ethyl ketone. These solvents can be used alone or in combination.

Specific examples of the dispersant to be included in the aqueous medium include anionic surfactants such as alkylbenzene sulfonic acid salts, α-olefin sulfonic acid salts, and phosphoric acid salts; cationic surfactants such as amine salts (such as alkyl amine salts, aminoalcohol fatty acid derivatives, polyamine fatty acid derivatives, and imidazoline), and quaternary ammonium salts (such as alkyltrimethyl ammonium salts, dialkyldimethyl ammonium salts, alkyldimethyl benzyl ammonium salts, pyridinium salts, alkyl isoquinolinium salts, and benzethonium chloride); nonionic surfactants such as fatty acid amide derivatives, polyhydric alcohol derivatives; and ampholytic surfactants such as alanine, dodecyldi(aminoethyl)glycin, di(octylaminoethyl)glycin, and N-alkyl-N,N-dimethylammonium betaine.

By using a surfactant having a fluoroalkyl group as the surfactant, good effects can be produced even when the added amount is small.

Specific examples of anionic surfactants having a fluoroalkyl group include, but are not limited thereto, fluoroalkyl carboxylic acids having from 2 to 10 carbon atoms and metal salts thereof, disodium perfluorooctanesulfonylglutamate, sodium 3-{omega-fluoroalkyl(C6-C11)oxy}-1-alkyl(C3-C4) sulfonate, sodium 3-{omega-fluoroalkanoyl(C6-C8)-N-ethylamino}-1-propanesulfonate, fluoroalkyl(C11-C20) carboxylic acids and metal salts thereof, perfluoroalkyl(C7-C13) carboxylic acids and metal salts thereof, perfluoroalkyl(C4-C12)sulfonate and metal salts thereof, perfluorooctanesulfonic acid diethanol amides, N-propyl-N-(2-hydroxyethyl)perfluorooctanesulfone amide, perfluoroalkyl(C6-C10)sulfoneamidepropyltrimethylammonium salts, salts of perfluoroalkyl(C6-C10)-N-ethylsulfonyl glycin, and monoperfluoroalkyl(C6-C16)ethylphosphic acid esters. These surfactants can be used alone or in combination.

Specific examples of the marketed products of anionic surfactants having a fluoroalkyl group include SARFRON S-111, S-112 and S-113, which are manufactured by Asahi Glass Co., Ltd.; FLUORAD FC-93, FC-95, FC-98 and FC-129, which are manufactured by Sumitomo 3M Ltd.; UNIDYNE DS-101 and DS-102, which are manufactured by Daikin Industries, Ltd.; MEGAFACE F-110, F-120, F-113, F-191, F-812 and F-833 which are manufactured by DIC Corp.; ECTOP EF-102, 103, 104, 105, 112, 123A, 306A, 501, 201 and 204, which are manufactured by Tohchem Products Co., Ltd.; and FUTARGENT F-100 and F150 manufactured by Neos.

Specific examples of cationic surfactants having a fluoroalkyl group include, but are not limited thereto, primary, secondary and tertiary aliphatic amines having a fluoroalkyl group, aliphatic quaternary ammonium salts (such as perfluoroalkyl(C6-C10)sulfoneamidepropyltrimethylammonium salts), benzalkonium salts, benzetonium chloride, pyridinium salts, and imidazolinium salts. These surfactants can be used alone or in combination.

Specific examples of the marketed products of cationic surfactants having a fluoroalkyl group include SARFRON S-121 (from Asahi Glass Co., Ltd.); FLUORAD FC-135 (from Sumitomo 3M Ltd.); UNIDYNE DS-202 (from Daikin Industries, Ltd.); MEGAFACE F-150 and F-824 (from DIC Corp.); ECTOP EF-132 (from Tohchem Products Co., Ltd.); and FUTARGENT F-300 (from Neos).

Particulate resins and/or particulate inorganic materials can be used as the dispersant. By adding a particulate resin or an inorganic material, aggregation of particles of the first liquid can be prevented, and therefore the first liquid can be evenly dispersed in an aqueous medium.

The material of the particulate resins for use as the dispersant is not particularly limited, and any known resins which can form an aqueous dispersion can be used as the particulate resin. Specific examples of such resins include vinyl resins, polyurethane, epoxy resins, polyester, polyamide, polyimide, silicone resins, phenolic resins, melamine resins, urea resins, aniline resins, ionomer resins, and polycarbonate. These resins can be used alone or in combination. Among these resins, vinyl resins, polyurethane, epoxy resins, and polyester are preferable because an aqueous resin dispersion including fine spherical resin particles can be easily prepared.

Specific examples of the vinyl resins include styrene-(meth)acrylate copolymers, styrene-butadiene copolymers, (meth)acrylic acid-acrylate copolymers, styrene-acrylonitrile copolymers, styrene-maleic anhydride copolymers, and styrene-(meth)acrylic acid copolymers.

The particulate resin is preferably a resin including a carboxyl group so that a charge controlling agent can be fixed on the surface thereof. Among such resins, resins having a unit obtained from (meth)acrylic acid are preferable.

Specific examples of such particulate inorganic materials for use as the dispersant include silica, colloidal silica, alumina, titanium oxide, colloidal titanium oxide, barium titanate, magnesium titanate, calcium titanate, strontium titanate, zinc oxide, tin oxide, quartz sand, clay, mica, sand-lime, diatom earth, chromium oxide, cerium oxide, red iron oxide, antimony trioxide, magnesium oxide, zirconium oxide, barium sulfate, barium carbonate, calcium carbonate, silicon carbide, silicon nitride, tricalcium phosphate, and hydroxyapatite. Among these inorganic materials, tricalcium phosphate, calcium carbonate, colloidal titanium oxide, colloidal silica, and hydroxyapatite are preferable, and hydroxyapatite, which is synthesized by reacting sodium phosphate with calcium chloride in water under basic conditions, is more preferable.

When a material soluble in acids or alkalis such as tricalcium phosphate is used as the dispersant, the dispersant can be removed from the resultant product, for example, by dissolving the dispersant adhered to the product in hydrochloric acid, and then washing the product with water.

Polymeric protection colloids can also be used as the dispersant. Specific examples of such polymeric protection colloids include polymers and copolymers prepared by using monomers such as monomers having a carboxyl group (e.g., acrylic acid, methacrylic acid, α-cyanoacrylic acid, α-cyanomethacrylic acid, itaconic acid, crotonic acid, fumaric acid, maleic acid, and maleic anhydride), acrylic monomers having a hydroxyl group (e.g., β-hydroxyethyl acrylate, β-hydroxyethyl methacrylate, β-hydroxypropyl acrylate, β-hydroxypropyl methacrylate, γ-hydroxypropyl acrylate, γ-hydroxypropyl methacrylate, 3-chloro-2-hydroxypropyl acrylate, 3-chloro-2-hydroxypropyl methacrylate, diethyleneglycolmonoacrylic acid esters, diethyleneglycolmonomethacrylic acid esters, glycerinmonoacrylic acid esters, glycerinmonomethacrylic acid esters, N-methylolacrylamide, and N-methylolmethacrylamide), vinyl alkyl ethers (e.g., vinyl methyl ether, vinyl ethyl ether, and vinyl propyl ether), esters of vinyl alcohol with a compound having a carboxyl group (e.g., vinyl acetate, vinyl propionate, and vinyl butyrate), amides and methylol compounds thereof (e.g, acrylamide, methacrylamide, and diacetoneacrylamide acids), monomers having a chlorocarbonyl group (e.g., acrylic acid chloride, and methacrylic acid chloride), and monomers having a nitrogen atom or an alicyclic ring having a nitrogen atom (e.g., vinyl pyridine, vinyl pyrrolidone, vinyl imidazole, and ethylene imine).

In addition, polymers such as polyoxyethylene compounds (e.g., polyoxyethylene, polyoxypropylene, polyoxyethylenealkyl amines, polyoxypropylenealkyl amines, polyoxyethylenealkyl amides, polyoxypropylenealkyl amides, polyoxyethylene nonylphenyl ethers, polyoxyethylene laurylphenyl ethers, polyoxyethylene stearylphenyl esters, and polyoxyethylene nonylphenyl esters); and cellulose compounds such as methyl cellulose, hydroxyethyl cellulose, and hydroxypropyl cellulose, can also be used as the polymeric protective colloid.

The method for preparing a particulate material by removing the organic solvent from the second liquid is not particularly limited. For example, a method in which the second liquid is gradually heated to evaporate the organic solvent; and a method in which the second liquid is sprayed under a dry environmental condition to evaporate the organic solvent and water, can be used.

The dry environmental condition is not particularly limited. Specific examples thereof include a heated flow current of air, nitrogen gas, carbon dioxide gas, and combusted gases. The flow current is preferably heated at a temperature not lower than the highest boiling point among the boiling points of one or more organic solvents and water included in the second liquid.

When performing this spray drying, a spray dryer, a belt dryer, a rotary kiln or the like can be used.

When heating the liquid (i.e., modified second liquid), which is a liquid obtained by removing the organic solvent from the second liquid or an intermediate liquid obtained by partially removing the organic solvent from the second liquid (i.e., the second liquid in a process of the solvent removing treatment), the content of the organic solvent in the liquid is preferably from 0 to 15% by weight. When the content is higher than the range, a problem in which particles in the liquid aggregate tends to be caused.

When the organic solvent remains in the third liquid, the third liquid is subjected again to a solvent removing treatment, followed by a washing treatment. If the organic solvent does not remain in the third liquid, the third liquid is subjected to a washing treatment. After performing the washing treatment, a charge controlling agent is added to the resultant particles (i.e., mother toner particles).

The washing treatment is not particularly limited as long as the dispersant can be removed from the resultant particles. For example, a method in which water is added to the third liquid while the third liquid is filtered is used. In this regard, it is preferable that the washed wet cake is dispersed in water, the pH of the dispersion is controlled so as to fall in a range of from 3.0 to 6.0, and then the dispersion is filtered, to efficiently remove the dispersant. When the pH is less than 3.0, a problem in which an impurity precipitates in the dispersion may be caused. In contrast, when the pH is greater than 6.0, a problem in which the dispersant cannot be efficiently removed tends to be caused.

The charge controlling agent is not particularly limited. Suitable materials for use as the charge controlling agent include Nigrosine dyes, triphenyl methane dyes, chromium-containing metal complex dyes, molybdic acid chelate pigments, Rhodamine dyes, alkoxyamines, quaternary ammonium salts, alkylamides, phosphor and its compounds, tungsten and its compounds, fluorine-containing surfactants, metal salts of salicylic acid, metal salts of salicylic acid derivatives, copper phthalocyanine, perylene, quinacridone, azo pigments, polymers having a functional group such as a sulfonate group, a carboxyl group, and a quaternary ammonium salt group. These materials can be used alone or in combination.

Specific examples of marketed charge controlling agents include BONTRON 03 (Nigrosine dye), BONTRON P-51 (quaternary ammonium salt), BONTRON S-34 (metal-containing azo dye), BONTRON E-82 (metal complex of oxynaphthoic acid), BONTRON E-84 (metal complex of salicylic acid), and BONTRON E-89 (phenolic condensation product), which are manufactured by Orient Chemical Industries Co., Ltd.; TP-302 and TP-415 (molybdenum complex of quaternary ammonium salt), which are manufactured by Hodogaya Chemical Co., Ltd.; COPY CHARGE PSY VP2038 (quaternary ammonium salt), COPY BLUE (triphenyl methane derivative), COPY CHARGE NEG VP2036 and COPY CHARGE NX VP434 (quaternary ammonium salt), which are manufactured by Hoechst AG; LRA-901 and LR-147 (boron complex), which are manufactured by Japan Carlit Co., Ltd.

In order to evenly fix a charge controlling agent on surfaces of the resultant particles, quaternary ammonium salts having a fluorine-containing group are preferably used as the charge controlling agent. Quaternary ammonium salts having a fluorine-containing group have good affinity for carboxyl groups, and can be dissolved in water including an alcohol. In addition, quaternary ammonium salts having a fluorine-containing group can be used in combination with metal-containing azo dyes.

Known quaternary ammonium salts having a fluorine-containing group can be used as the charge controlling agent, but compounds having the following formula are preferable.

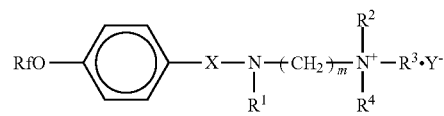

wherein Rf represents a perfluoroalkyl group, X represents a divalent organic group, each of $R^1$ to $R^4$ independently represents a hydrogen atom, a fluorine-containing group, or a hydrocarbon group, $Y^-$ represents a counter ion, and m is a positive integer.

These compounds can be used alone or in combination.

The number of carbon atoms included in the perfluoroalkyl group Rf is from 3 to 60, preferably from 3 to 30, and more preferably from 3 to 15. Specific examples of the perfluoroalkyl group include, but are not limited thereto, $CF_3(CF_2)_5$—, $CF_3(CF_2)_6$—, —$CF_3(CF_2)_7$—, $CF_3(CF_2)_8$—, $CF_3(CF_2)_9$—, $CF_3(CF_2)_{10}$—, $CF_3(CF_2)_{11}$—, $CF_3(CF_2)_{12}$—, $CF_3(CF_2)_{13}$—, $CF_3(CF_2)_{14}$—, $CF_3(CF_2)_{15}$—, $CF_3(CF_2)_{16}$—, $CF_3(CF_2)_{17}$— and $(CF_3)_2CF(CF_2)_6$—.

The counter ion $Y^-$ is not particularly limited, and specific examples thereof include halogenide ions, sulfate ion, nitrate ion, phosphate ion, thiocyanate ion, and organic acid ions. Among these ions, halogenide ions such as fluoride, chloride, bromide, and iodide ions are preferable.

The divalent organic group X is not particularly limited, and specific examples thereof include —$SO_2$—, —CO—, —$(CH_2)_x$—, —$SO_2N(R^5)$—$(CH_2)_x$—, and —$(CH_2)_x$—CH(OH)—$(CH_2)_x$—, wherein x is an integer of from 1 to 6, and $R^5$ represents an alkyl group having 1 to 10 carbon atoms. Among these groups, —$SO_2$—, —CO—, —$(CH_2)_2$—, —$SO_2N(C_2H_5)$—$(CH_2)_2$—, and —$CH_2CH(OH)CH_2$— are preferable, and —$SO_2$—, —CO— are more preferable.

The integer m is preferably 1 to 20, and more preferably from 1 to 10.

The hydrocarbon groups for use as the groups $R^1$ to $R^4$ are not particularly limited. Suitable hydrocarbon groups include alkyl groups, alkenyl groups, and aryl groups, which may be substituted.

Alkyl groups for use as the groups $R^1$ to $R^4$ preferably have 1 to 10 carbon atoms. Specific examples thereof include, but are not limited thereto, methyl, ethyl, n-propyl, isopropyl, n-butyl, isobutyl, sec-butyl, n-hexyl, isohexyl, n-heptyl, n-octyl, isooctyl, n-decyl, and isodecyl groups.

Alkenyl groups for use as the groups $R^1$ to $R^4$ preferably have 2 to 10 carbon atoms. Specific examples thereof include, but are not limited thereto, vinyl, allyl, propenyl, isopropenyl, butenyl, hexenyl, and octenyl groups.

Aryl groups for use as the groups $R^1$ to $R^4$ preferably have 6 to 24 carbon atoms. Specific examples thereof include, but are not limited thereto, phenyl, tolyl, xylyl, cumenyl, stylyl, mesityl, cynnamyl, phenethyl, and benzhydryl groups.

The added amount of a charge controlling agent is generally from 0.1% to 10% by weight, and preferably from 0.2% to 5% by weight, based on the weight of the binder resin included in the toner. When the added amount of a charge controlling agent is greater than 10% by weight, the electrostatic attraction between the toner and a developing roller seriously increases, thereby causing problems such that the fluidity of the toner on the developing roller deteriorates, and the image density of images produced by the toner decreases.

Particles (mother toner particles) to which a charge controlling agent is added are typically filtered, and then dried. Next, additives such as fluidity improving agents and cleanability improving agents are optionally added to the dried particles, resulting in formation of a toner.

Specific examples of such fluidity improving agents for use in the toner include, but are not limited thereto, silica, alumina, titanium oxide, barium titanate, magnesium titanate, calcium tranate, strontium titanate, zinc oxide, tin oxide, quartz sand, clay, mica, sand-lime, diatom earth, chromium oxide, cerium oxide, red iron oxide, antimony trioxide, magnesium oxide, zirconium oxide, barium sulfate, barium carbonate, calcium carbonate, silicon carbide, and silicon nitride.

The primary particle diameter of the fluidity improving agent included in the toner is generally from 5 nm to 2 µm, and preferably from 5 nm to 500 nm. The BET specific surface area of the fluidity improving agent is generally from 20 to 500 $m^2/g$.

The content of a fluidity improving agent in the toner is generally from 0.01% to 5% by weight, and preferably from 0.01% to 2% by weight, based on the weight of the toner.

The fluidity improving agent to be included in the toner is preferably hydrophobized using a surface treatment agent. Specific examples of such a surface treatment agent include, but are not limited thereto, silane coupling agents, silylation agents, silane coupling agents having a fluorinated alkyl group, organic titanate coupling agents, aluminum type coupling agents, silicone oils, and modified silicone oils.

Specific examples of the cleanability improving agent for use in the toner include, but are not limited thereto, fatty acid metal salts such as zinc stearate, and calcium stearate; and particles of resins such as polymethyl methacrylate, and polystyrene. It is preferable to use particulate resins, which have a narrow particle diameter distribution and whose volume average particle diameter thereof is from 0.01 µm to 1 µm.

When mother toner particles, which are prepared by the toner production method mentioned above, are mixed with an additive, a mechanical impact force may be applied to the mixture to fix the additive to surfaces of the mother toner particles.

The method for applying a mechanical impact force to the mixture is not particularly limited. Specific examples of the mechanical impact applying method include a method in which an impact is applied using a blade rotated at a high speed, and a method in which the mixture is fed into a high speed stream to accelerate the mixture so that the particles of the mixture collide with each other, or the complex of the mixture (i.e., the complex of the mother toner particles and the additive) collides with a collision plate.

Specific examples of such mechanical impact applicators include ONG MILL (manufactured by Hosokawa Micron Co., Ltd.), modified I TYPE MILL in which the pressure of air used for pulverizing is reduced (manufactured by Nippon Pneumatic Mfg. Co., Ltd.), HYBRIDIZATION SYSTEM (manufactured by Nara Machine Co., Ltd.), KRYPTRON SYSTEM (manufactured by Kawasaki Heavy Industries, Ltd.), and automatic mortars.

The thus prepared toner can be used as a magnetic or non-magnetic one component developer including no carrier or a two component developer including a carrier. When the toner is used for a two component developer, the toner is mixed with a magnetic carrier. The mixing ratio (T/C) of the toner (T) to the carrier (C) is generally from 1/100 to 10/100 by weight, and preferably from 3/100 to 9/100 by weight.

Suitable materials for use as the carrier include known carrier materials such as iron powders, ferrite powders, and magnetite powders, which preferably have a particle diameter of from 20 µm to 200 µm.

The surface of the carrier may have a cover layer on a surface thereof. The material constituting the cover layer is not particularly limited. Specific examples of the material of the cover layer of the carrier include amino resins such as urea-formaldehyde resins, melamine resins, benzoguanamine resins, urea resins, and polyamide resins; epoxy resins; vinyl or vinylidene resins such as acrylic resins, polymethylmethacrylate, polyacrylonitirile, polyvinyl acetate, polyvinyl alcohol, polyvinyl butyral, styrene resins (e.g., polystyrene, and styrene-acrylic copolymers), halogenated olefin resins (e.g., polyvinyl chloride), polyethylene, polyvinyl fluoride, polyvinylidene fluoride, polytrifluoroethylene, polyhexafluoropropylene, vinylidene fluoride-acrylic copolymers, vinylidene fluoride-vinyl fluoride copolymers, and tetrafluoroethylene-vinylidene fluoride-monomer having no fluorine atom copolymers; polyester resins such as polyethyleneterephthalate and polybutyleneterephthalate; polycarbonate; and silicone resins.

If desired, an electroconductive powder may be included in the cover layer. Specific examples of such electroconductive powders include metal powders, carbon blacks, titanium oxide, tin oxide, and zinc oxide. The average particle diameter of such electroconductive powders is preferably not greater than 1 µm so that the resistance of the resultant carrier can be satisfactorily controlled.

The density (d) of the modified second liquid which is a liquid obtained by removing the organic solvent from the second liquid or the intermediate liquid, which is the second liquid in a process of the solvent removing treatment, and the density (d') of the third liquid satisfy the following relation:

$$[|d-d'|/d] \times 100 \leq 1.$$

When this relation is satisfied (i.e., when the density change is not greater than 1%), formation of convection flow in the reaction tube 100 is avoided, and therefore the toner components can be flown stably in the reaction tube 100. The main cause of the density change is temperature change. In order to prevent such temperature change, a method in which the modified second liquid is allowed to have the same temperature as that in the reactor 10 before the modified second liquid is supplied to the reactor 10 can be used.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Preparation of Prepolymer

The following components were contained in a reaction vessel equipped with a condenser, a stirrer, and a nitrogen feed pipe.

| | |
|---|---|
| Ethylene oxide (2 mole) adduct of bisphenol A | 795 parts |
| Isophthalic acid | 200 parts |
| Terephthalic acid | 65 parts |
| Dibutyl tin oxide | 2 parts |

The mixture was subjected to a condensation reaction for 8 hours at 210° C. and normal pressure under a nitrogen gas flow. The reaction was further continued for 5 hours under a reduced pressure of from 10 mmHg to 15 mmHg (1333 Pa to 2000 Pa) while removing water therefrom. After the reaction product was cooled to 80° C., the reaction product was reacted with 170 parts of isophorone diisocyanate in ethyl acetate for 2 hours. Thus, a prepolymer (1) was prepared.

Preparation of First Liquid

The following components were fed into a tank.

| | |
|---|---|
| Ethyl acetate dispersion of carnauba wax (solid content of 35%) | 170 parts |
| Polyester resin | 120 parts |
| Pigment Yellow PY155 (from Clariant AG) | 20 parts |
| Ethyl acetate | 70 parts |
| Isophorone diamine | 2 parts |

After the components were mixed for 2 hours in the tank, the mixture was subjected to a circulation dispersing treatment for 1 hour using a dispersing machine, EBARA MILDER from Ebara Corporation. Thus, a first liquid (1) was prepared. The first liquid (1) had an acid value of 4.5 mgKOH/g.

In addition, 25 parts of the prepolymer (1) and 25 part of ethyl acetate were fed into another tank, and the mixture was agitated for 4 hours. Thus, a first liquid (2) was prepared.

Preparation of Aqueous Medium

The following components were fed into a tank.

| | |
|---|---|
| Water | 945 parts |
| Aqueous dispersion of styrene-methacrylic acid-butyl acrylate copolymer (solid content of 20% by weight) | 40 parts |
| Aqueous solution of sodium dodecyl-diphenyletherdisulfonate (ELEMINOL MON-7 from Sanyo Chemical Industry, Inc., solid content of 50% by weight) | 160 parts |
| Ethyl acetate | 90 parts |

The components were mixed while agitated in the tank. Thus, an aqueous medium (1) was prepared.

Example 1

The first liquid (1), the first liquid (2), and the aqueous medium (1) were fed into a pipeline homomixer (from Primix Corp.) at feeding speeds of 3,560 g/min, 440 g/min, and 6,000 g/min, respectively, to prepare a second liquid. The second liquid had a volume average particle diameter of 5.9 μm, and a ratio V/N of 1.13, which is the ratio of the volume average particle diameter (V) of the second liquid to the number average particle diameter (N) thereof.

Next, the second liquid was heated to 45° C. and agitated for 5 hours by an agitation blade, which was rotated such that the outer edge thereof has a rotation speed of 10.5 m/sec, at atmospheric pressure (101.3 kPa) to remove the organic solvent therefrom, resulting in formation of particles, i.e., a slurry (1). Further, the slurry (1) was continuously fed into the reactor 10 to prepare a third liquid. In this regard, the reactor 10 has a reaction tube 100 having an inner diameter (D') of 150 mm and a length of 2,000 mm, and ten perforated plates 110 which have a diameter (D) of 140 mm, a central thickness (t) of 20 mm, and an outer edge thickness (t') of 20 mm and which are arranged in the reaction tube 100 at an interval (S) of 75 mm (i.e., S/D'=0.5). The size and position of holes of the perforated plates 110 are the same as those described in JIS Z8766. In addition, the perforated plates 110 are a flat plate having no slanting surface. Further, the inside of the reaction tube 100 was heated from outside so as to have a temperature of 65° C. In this regard, the average residence time of the liquid in the reaction tube 100 is one hour, which is determined by calculation based on the volume of the reaction tube and the flow rate of the liquid.

Furthermore, the temperature at the entrance of the reaction tube 100 (entrance of the reactor) was 25° C., the density of the liquid (i.e., the slurry (1)) at the entrance was 1.043 g/cm$^3$, the temperature at the exit of the reaction tube 100 (exit of the reactor) was 65° C., and the density of the liquid (i.e., the third liquid) at the exit was 1.030 g/cm$^3$.

The third liquid fed from the reaction tube 100 was subjected to a pressure-filtration using a filter press, followed by a penetration washing treatment so that the filtrate has an electroconductivity of 100 μS/cm. Thus, a filtered cake (1) was obtained. Next, water was added to the filtered cake (1) so that the solid content of the mixture becomes 20% by weight, and 10% by weight hydrochloric acid was added to the diluted cake while agitating the mixture using an agitator until the mixture had a pH of 4.0 to wash the particles for 30 minutes. After the washing treatment, the mixture was subjected to a pressure-filtration using a filter press, followed by a penetration washing treatment so that the filtrate has an electroconductivity of 100 μS/cm. Thus, a filtered cake (2) was obtained. Next, water was added to the filtered cake (2) so that the solid content of the mixture becomes 25% by weight, and the mixture was agitated using an agitator. Thus, a washed slurry (1) was prepared.

Next, a 1% by weight methanol/water solution of a charge controlling agent, N,N,N-trimethyl-[3-(4-perfluorononenyloxybenzamide)propyl]ammonium iodide (FUTARGENT 310 from Neos), was added to the washed slurry (1) so that the charge controlling agent is added in an amount of 0.2% by weight based on the solid component of the slurry (1). The mixture was agitated for 30 minutes to prepare mother toner particles. Thus, a slurry (2) including the mother toner particles was prepared. The slurry (2) was then subjected to a centrifugal separation treatment using a centrifugal separator to separate the solid (mother toner particles) from the liquid. The mother toner particles were dried for 24 hours at 40° C. using a decompression dryer.

Next, the following components were mixed using a HENSCHEL MIXER mixer.

| | |
|---|---|
| Mother toner particles prepared above | 100 parts |
| Hydrophobized silica (UFP-35 from Denki Kagaku Kogyo Kabushiki Kaisha) | 0.5 parts |
| Hydrophobized silica (H2000 from Clariant Japan) | 0.5 parts |
| Hydrophobized titanium oxide (MT150IB from Tayca Corporation) | 0.5 parts |

The mixture was filtered by a screen having openings of 37 μm to remove coarse particles therefrom. Thus, a toner (1) was prepared.

Example 2

The procedure for preparation of the toner in Example 1 was repeated except that the number of the perforated plates was two, and the ratio S/D' was 5.0 to prepare a toner (2). In this regard, the temperature at the entrance of the reaction tube 100 was 25° C., the density of the liquid (i.e., the slurry (1)) at the entrance was 1.042 g/cm$^3$, the temperature at the exit of the reaction tube 100 was 65° C., and the density of the liquid (i.e., the third liquid) at the exit was 1.031 g/cm$^3$.

Example 3

The procedure for preparation of the toner in Example 1 was repeated except that the ratio S/D' was changed to 0.2 to prepare a toner (3). In this regard, the temperature at the entrance of the reaction tube 100 was 25° C., the density of the liquid (i.e., the slurry (1)) at the entrance was 1.043 g/cm$^3$, the temperature at the exit of the reaction tube 100 was 65° C., and the density of the liquid (i.e., the third liquid) at the exit was 1.031 g/cm$^3$.

Example 4

The procedure for preparation of the toner in Example 1 was repeated except that each of the perforated plates were replaced with a perforated plate having a central thickness (t) of 20 mm and an outer edge thickness (t') of 5 mm, the inner temperature of the reaction tube 100 was changed to 70° C., and the slurry (1) was heated to 45° C. by a heat exchanger before fed into the reaction tube 100 to prepare a toner (4). In this regard, the temperature at the entrance of the reaction tube 100 was 65° C., the density of the liquid (i.e., the slurry (1)) at the entrance was 1.037 g/cm$^3$, the temperature at the exit of the reaction tube 100 was 70° C., and the density of the liquid (i.e., the third liquid) at the exit was 1.026 g/cm$^3$.

Example 5

The procedure for preparation of the toner in Example 1 was repeated except that the slurry (1) was heated to 65° C. by a heat exchanger before fed into the reaction tube 100, and the number of the perforated plates was changed to five to prepare a toner (5). In this regard, the temperature at the entrance of the reaction tube 100 was 65° C., the density of the liquid (i.e., the slurry (1)) at the entrance was 1.030 g/cm$^3$, the temperature at the exit of the reaction tube 100 was 65° C., and the density of the liquid (i.e., the third liquid) at the exit was 1.032 g/cm$^3$.

Example 6

The procedure for preparation of the toner in Example 1 was repeated except that five of the ten perforated plates were replaced with a helical plate 120 including a 180° rightward twisted plate 121 and a 180° leftward twisted plate 122, which are serially arranged so as to be displaced from each other at an angle of 90° to prepare a toner (6). In this regard, the length L of each of the twisted plates 121 and 122 in the direction perpendicular to the flow direction of the raw material (the slurry) was 150 mm, and the length L' thereof in the flow direction of the raw material was 225 mm. The temperature at the entrance of the reaction tube 100 was 25° C., the density of the liquid (i.e., the slurry (1)) at the entrance was 1.043 g/cm$^3$, the temperature at the exit of the reaction tube 100 was 65° C., and the density of the liquid (i.e., the third liquid) at the exit was 1.025 g/cm$^3$.

Example 7

The procedure for preparation of the toner in Example 6 was repeated except that the length L of each of the twisted plates 121 and 122 in the direction perpendicular to the flow direction of the raw material was 80 mm, the length L' thereof in the flow direction of the raw material was 160 mm, and the slurry (1) was heated to 55° C. by a heat exchanger before fed into the reaction tube 100 to prepare a toner (7). The temperature at the entrance of the reaction tube 100 was 55° C., the density of the liquid (i.e., the slurry (1)) at the entrance was 1.035 g/cm$^3$, the temperature at the exit of the reaction tube 100 was 65° C., and the density of the liquid (i.e., the third liquid) at the exit was 1.025 g/cm$^3$.

Example 8

The procedure for preparation of the toner in Example 1 was repeated except that the inner diameter and the length of the reaction tube 100 were changed to 300 mm and 7,000 mm, respectively, the ten perforated plates were replaced with two perforated plates, each of which has a central thickness (t) of 39 mm, an outer edge thickness (t') of 0.5 mm, and a diameter of 200 mm and each of which has holes whose size and position are described in JIS Z8766, and the average residence time of the liquid in the reaction tube was 6 hours, to prepare a toner (8). In this regard, the temperature at the entrance of the reaction tube 100 was 25° C., the density of the liquid (i.e., the slurry (1)) at the entrance was 1.043 g/cm$^3$, the temperature at the exit of the reaction tube 100 was 65° C., and the density of the liquid (i.e., the third liquid) at the exit was 1.026 g/cm³.

Example 9

The procedure for preparation of the toner in Example 8 was repeated except that the pigment yellow PY155 (from Clariant AG) used for preparing the first liquid was replaced with a pigment red PR1022 (from DIC Corp.), the perforated plates were replaced with two perforated plates each of which has a central thickness of 39 mm, an outer edge thickness of 38 mm, and a diameter (D) of 150 mm and each of which has holes whose size and position are described in JIS Z8766, to prepare a toner (9). In this regard, the temperature at the entrance of the reaction tube 100 was 25° C., the density of the liquid (i.e., the slurry (1)) at the entrance was 1.042 g/cm³, the temperature at the exit of the reaction tube 100 was 65° C., and the density of the liquid (i.e., the third liquid) at the exit was 1.026 g/cm³.

Example 10

The procedure for preparation of the toner in Example 9 was repeated except that the inner temperature of the reaction tube 100 was changed to 40° C. to prepare a toner (10). In this regard, the temperature at the entrance of the reaction tube 100 was 25° C., the density of the liquid (i.e., the slurry (1)) at the entrance was 1.042 g/cm³, the temperature at the exit of the reaction tube 100 was 40° C., and the density of the liquid (i.e., the third liquid) at the exit was 1.035 g/cm³.

Example 11

The procedure for preparation of the toner in Example 5 was repeated except that the first liquids (1) and (2) were replaced with a liquid including the following components.

| | |
|---|---|
| Styrene monomer | 67 parts |
| 2-Ethylhexyl acrylate | 25 parts |
| 1,6-Hexanediol diacrylate (crosslinking agent) | 0.4 parts |
| 2,2'-azobis(2,4-dimethylvaleronitrile) (polymerization initiator) | 2 parts |

Thus, a toner (11) was prepared. In this regard, the temperature at the entrance of the reaction tube 100 was 65° C., the density of the liquid (i.e., the slurry (1)) at the entrance was 1.031 g/cm³, the temperature at the exit of the reaction tube 100 was 65° C., and the density of the liquid (i.e., the third liquid) at the exit was 1.032 g/cm³.

Comparative Example 1

The procedure for preparation of the toner in Example 1 was repeated except that the diameter of the perforated plates 110 was changed to 150 mm to prepare a toner (12). In this regard, the temperature at the entrance of the reaction tube 100 was 25° C., the density of the liquid (i.e., the slurry (1)) at the entrance was 1.040 g/cm³, the temperature at the exit of the reaction tube 100 was 65° C., and the density of the liquid (i.e., the third liquid) at the exit was 1.025 g/cm³.

Comparative Example 2

The procedure for preparation of the toner in Example 1 was repeated except that the interval (S) of the perforated plates 110 was changed so that the ratio S/D' is 0.1 to prepare a toner (13). In this regard, the temperature at the entrance of the reaction tube 100 was 25° C., the density of the liquid (i.e., the slurry (1)) at the entrance was 1.042 g/cm³, the temperature at the exit of the reaction tube 100 was 65° C., and the density of the liquid (i.e., the third liquid) at the exit was 1.025 g/cm³.

Comparative Example 3

The procedure for preparation of the toner in Example 2 was repeated except that the interval (S) of the perforated plates 110 was changed so that the ratio S/D' is 5.1 to prepare a toner (14). In this regard, the temperature at the entrance of the reaction tube 100 was 25° C., the density of the liquid (i.e., the slurry (1)) at the entrance was 1.041 g/cm³, the temperature at the exit of the reaction tube 100 was 65° C., and the density of the liquid (i.e., the third liquid) at the exit was 1.025 g/cm³.

Comparative Example 4

The procedure for preparation of the toner in Example 1 was repeated except that the perforated plates 110 were not used to prepare a toner (15). In this regard, the temperature at the entrance of the reaction tube 100 was 25° C., the density of the liquid (i.e., the slurry (1)) at the entrance was 1.042 g/cm³, the temperature at the exit of the reaction tube 100 was 65° C., and the density of the liquid (i.e., the third liquid) at the exit was 1.024 g/cm³.

The toner production methods and toners of Examples 1-11 and Comparative Examples 1-4 were evaluated as follows.

1. Amount of Deposition Formed in the Reaction Tube (Deposition Amount)

After the liquid (i.e., the slurry (1)) obtained by removing the solvent from the second liquid was fed for 24 hours to the reactor heated to 65° C., the liquid was extracted from the reactor, and the deposition was scraped out of the reactor. After the deposition was dried, the dried deposition was weighed. The deposition amount was defined as D/V, wherein D represents the weight of the dried deposition in units of gram, and V represents the volume of the reactor in units of m³. The deposition amount was classified into the following three grades.

⊚: The deposition amount is less than 50 g/m³. (Excellent)
○: The deposition amount is not less than 50 g/m³, and less than 100 g/m³. (Acceptable)
X: The deposition amount is not less than 100 g/m³. (Unacceptable)

2. Minimum Dimensionless Residence Time (MDRT)

After the reactor was filled with water, a 0.006% by weight aqueous NaCl solution was fed into the reactor while measuring the electroconductivity of water at the exit of the reactor to determine the time (i.e., minimum residence time, MRT) until the electroconductivity increased. On the other hand, the residence time (set residence time, SRT) was calculated from the volume of the reactor and the flow rate of the NaCl solution. The minimum dimensionless residence time (MDRT) was defined by the following equation:

$$MDRT = MRT/SRT.$$

The minimum dimensionless residence time (MDRT) is an indicator of short path. Specifically, a reactor having a small minimum dimensionless residence time causes the short-path problem. The minimum dimensionless residence time (MDRT) was classified into the following three grades.

◎: The MDRT is not less than 0.7. (Excellent)
○: The MDRT is less than 0.7 and not less than 0.4. (Acceptable)
X: The MDRT is less than 0.4. (Unacceptable)

3. Hot Offset Temperature of Toner (HOT)

A toner image formed on a plain paper, TYPE 6200 from Ricoh Co., Ltd., using a copier MF2200 from Ricoh Co., Ltd. The toner image was fixed using a fixing device of the copier, which is a modified version of the fixing device of the copier and which includes a TEFLON roller as the fixing roller, while changing the fixing temperature to determine the hot offset temperature (i.e., maximum fixing temperature) of the toner. In this regard, the paper feeding speed was 50 mm/sec, the fixing pressure was 2.0 kgf/cm² (0.196 MPa), and the nip width of the fixing nip was 4.5 mm. The hot offset property was classified into the following three grades.

◎: The hot offset temperature is not lower than 190° C. (Excellent)
○: The hot offset temperature is lower than 190° C. and not lower than 180° C. (Acceptable)
X: The hot offset temperature is lower than 180° C. (Unacceptable)

4. Overall Evaluation

In each of the evaluations 1-3, the following points were given.

◎: 4 points
○: 2 points
X: 0 points

The overall evaluation was performed as follows.

◎: The total point is not less than 10 points. (Excellent)
○: The total point is less than 10 points and not less than 8 points. (Good)
Δ: The total point is less than 8 points and not less than 6 points. (Acceptable)
X: There is at least one X grade in the evaluations 1-3. (Bad)

The toner production conditions and the evaluation results are shown in Tables 1-(1) to 1-(3) below.

TABLE 1-(1)

| | Reactor | | Perforated plates | | | | | |
|---|---|---|---|---|---|---|---|---|
| | Inner diameter (D') (mm) | Length (mm) | Central thickness (t) (mm) | Periphral thickness (t') (mm) | Diameter (D) (mm) | Number of plates (pieces) | Interval (S) (mm) | S/D' |
| Ex. 1 | 150 | 2000 | 20 | 20 | 140 | 10 | 75 | 0.5 |
| Ex. 2 | 150 | 2000 | 20 | 20 | 140 | 2 | 750 | 5.0 |
| Ex. 3 | 150 | 2000 | 20 | 20 | 140 | 10 | 30 | 0.2 |
| Ex. 4 | 150 | 2000 | 20 | 5 | 140 | 10 | 75 | 0.5 |
| Ex. 5 | 150 | 2000 | 20 | 5 | 140 | 5 | 75 | 0.5 |
| Ex. 6 | 150 | 2000 | 20 | 20 | 140 | 5 | 75 | 0.5 |
| Ex. 7 | 150 | 2000 | 20 | 20 | 140 | 5 | 75 | 0.5 |
| Ex. 8 | 300 | 7000 | 39 | 0.5 | 200 | 2 | 150 | 0.5 |
| Ex. 9 | 300 | 7000 | 39 | 38 | 150 | 2 | 150 | 0.5 |
| Ex. 10 | 300 | 7000 | 39 | 38 | 150 | 2 | 150 | 0.5 |
| Ex. 11 | 150 | 2000 | 20 | 5 | 140 | 5 | 75 | 0.5 |
| Comp. Ex. 1 | 150 | 2000 | 20 | 20 | 150 | 10 | 150 | 1.0 |
| Comp. Ex. 2 | 150 | 2000 | 20 | 20 | 140 | 10 | 15 | 0.1 |
| Comp. Ex. 3 | 150 | 2000 | 20 | 20 | 140 | 2 | 765 | 5.1 |
| Comp. Ex. 4 | 150 | 2000 | — | — | — | 0 | — | — |

TABLE 1-(2)

| | Length (L) of twisted plates in the direction perpendicular to the flow direction | Length (L') of twisted plates in the flow direction | Density of the liquid at the entrance of the reactor (d) (g/cm³) | Density of the liquid at the exit of the reactor (d') (g/cm³) | Change rate of density [∣d-d'∣/d] × 100 |
|---|---|---|---|---|---|
| Ex. 1 | — | — | 1.043 | 1.030 | 1.25 |
| Ex. 2 | — | — | 1.042 | 1.031 | 1.06 |
| Ex. 3 | — | — | 1.043 | 1.031 | 1.15 |
| Ex. 4 | — | — | 1.037 | 1.026 | 1.06 |
| Ex. 5 | — | — | 1.030 | 1.032 | 0.19 |
| Ex. 6 | 150 | 225 | 1.043 | 1.025 | 1.73 |
| Ex. 7 | 80 | 160 | 1.035 | 1.025 | 0.97 |
| Ex. 8 | — | — | 1.043 | 1.026 | 1.63 |
| Ex. 9 | — | — | 1.042 | 1.026 | 1.54 |
| Ex. 10 | — | — | 1.042 | 1.035 | 0.67 |
| Ex. 11 | — | — | 1.031 | 1.032 | 0.10 |
| Comp. Ex. 1 | — | — | 1.040 | 1.025 | 1.44 |
| Comp. Ex. 2 | — | — | 1.042 | 1.025 | 1.63 |
| Comp. Ex. 3 | — | — | 1.041 | 1.025 | 1.54 |
| Comp. Ex. 4 | — | — | 1.042 | 1.024 | 1.73 |

TABLE 1-(3)

| | Deposition amount (g/m³) | Minimum dimensionless residence time | Hot offset temperature (° C.) | Overall evaluation |
|---|---|---|---|---|
| Ex. 1 | 85 (○) | 0.58 (○) | 185 (○) | Δ |
| Ex. 2 | 56 (○) | 0.41 (○) | 180 (○) | Δ |
| Ex. 3 | 92 (○) | 0.42 (○) | 180 (○) | Δ |
| Ex. 4 | 80 (○) | 0.61 (○) | 185 (○) | Δ |
| Ex. 5 | 75 (○) | 0.70 (◎) | 190 (◎) | ◎ |
| Ex. 6 | 55 (○) | 0.80 (◎) | 190 (◎) | ◎ |
| Ex. 7 | 12 (◎) | 0.70 (◎) | 185 (○) | ◎ |

TABLE 1-(3)-continued

| | Deposition amount (g/m³) | Minimum dimensionless residence time | Hot offset temperature (° C.) | Overall evaluation |
|---|---|---|---|---|
| Ex. 8 | 30 (◎) | 0.51 (○) | 185 (○) | ○ |
| Ex. 9 | 73 (○) | 0.54 (○) | 185 (○) | Δ |
| Ex. 10 | 15 (◎) | 0.60 (○) | 180 (○) | ○ |
| Ex. 11 | 81 (○) | 0.71 (◎) | 190 (◎) | ◎ |
| Comp. Ex. 1 | 125 (X) | 0.58 (○) | 190 (◎) | X |
| Comp. Ex. 2 | 101 (X) | 0.39 (X) | 180 (○) | X |
| Comp. Ex. 3 | 57 (○) | 0.38 (X) | 180 (○) | X |
| Comp. Ex. 4 | 1 (◎) | 0.30 (X) | 175 (X) | X |

It is clear from Tables 1-(1) to 1-(3) that the reactors of Examples 1-11 can reduce the deposition amount and chance of occurrence of the short-path problem even when a slurry including solid toner components is used as the raw material, and the toners produced by the reactors have good hot offset resistance.

The above-described reactors are examples of the present invention, and the reactor of the present invention is not limited thereto. The present invention includes the following embodiments, each of which produces its specific effects.

Embodiment A

This reactor 10 heats a slurry raw material including a solid component, which is continuously fed from an end of the reactor relative to the central axial direction of the reaction tube 100. Plural perforated plates 110 are arranged in the reaction tube 100 so as to separate the inside of the reaction tube into plural small compartments. In this regard, the reactor satisfies the following relations:

$$(1/2) \cdot D' \leq D < D', \text{ and } 0.2 \leq S/D' \leq 5.0,$$

wherein D represents the diameter of the perforated plates, D' represents the inner diameter of the reaction tube 100, and S represents the intervals of the perforated plates.

In each of the small compartments, part of the raw material flowing in a central portion of the reaction tube is moved toward the inner surface of the reaction tube so as to flow through the gap between the inner surface of the reaction tube and the outer edge of the perforated plates, thereby preventing formation of deposition of the solid component on the surface of the perforated plates. In addition, the residence time of the raw material can be controlled so as to be uniform throughout the reaction tube (i.e., at any portions on the cross-sectional surface of the reaction tube perpendicular to the axial direction of the reaction tube), thereby reducing chance of occurrence of the short-path problem. Therefore, even when the reactor heats the slurry raw material, formation of deposition of the raw material and occurrence of the short-path problem can be prevented without severely controlling the heating temperature (e.g., the temperature at the entrance and exit of the reaction tube).

Embodiment B

This reactor has a feature such that each of the perforated plates 110 of the embodiment A mentioned above has a slanting upper surface which is slanting so as to satisfy a relation, t'<t, wherein t represents the thickness of the central portion of the perforated plates, and t' represents the thickness of the outer edge portion of the perforated plates. In this case, even when the solid component of the slurry raw material is deposited on the upper surface of the perforated plates, the deposited solid component slides off the slanting upper surface, thereby making it possible to securely prevent occurrence of the deposition problem.

Embodiment C

This reactor has a feature such that some or all of the perforated plates of the embodiment A or B mentioned above are replaced with a helical plate 120 including a rightward twisted plate 121 and a leftward twisted plate 122, which are serially arranged while displaced from each other at an angle of 90°, and the helical plate satisfies the following relation:

$$(1/2) \cdot D' \leq L \leq D',$$

wherein L represents the length (width) of each of the twisted plates 121 and 122 in the direction perpendicular to the raw material flowing direction, and D' represents the inner diameter of the reaction tube 100.

In this reactor, the raw material fed into the reaction tube 100 is spirally flown smoothly along the surfaces of the twisted plates 121 and 122 without staying on the surfaces of the twisted plates. Therefore, occurrence of the deposition problem can be prevented, and the residence time of the raw material can be controlled so as to be uniform throughout the reaction tube (i.e., at any portions on the cross-sectional surface of the reaction tube perpendicular to the axial direction of the reaction tube), thereby reducing chance of occurrence of the short-path problem.

Embodiment D

This reactor has a feature such that in the embodiment C mentioned above, the length L' of each of the twisted plates 121 and 122 in the raw material flowing direction is loner than 1.5L (L represents the width of each of the twisted plates 121 and 122). In this reactor, the distance of the flow path of the raw material flowing along the surfaces of the twisted plates can be prolonged, thereby further reducing the amount of the raw material deposited in the reaction tube.

Embodiment E

This embodiment E of the present invention is a toner production method which includes dissolving or dispersing toner components including at least a binder resin component including a compound having an active hydrogen group and a polymer having a functional group reactive with the active hydrogen group in an organic solvent to prepare a first liquid; emulsifying or dispersing the first liquid in an aqueous medium to prepare a second liquid; partially or perfectly removing the organic solvent from the second liquid to prepare a modified second liquid; and heating the modified second liquid by feeding the modified second liquid through one of the reactors of the embodiments A-D mentioned above to prepare a third liquid including a particulate binder resin. By using this method, the modified second liquid (raw material) can be continuously subjected to a predetermined heat treatment without severely controlling the heating temperature (e.g., the temperatures at the entrance and exit of the reaction tube) while preventing occurrence of the deposition problem and the short-path problem, thereby stably producing the third liquid, resulting in production of a toner having good hot offset resistance.

Embodiment F

This embodiment F has a feature in addition to the feature of the embodiment E mentioned above such that the following relation is satisfied:

$$[|d-d'|/d] \times 100 \leq 1,$$

wherein d represents the density of the modified second liquid, and d' represents the density of the third liquid.

By using this method, i.e., by controlling the density change rate so as to be not greater than 1% when preparing the third liquid, formation of convection flow in the reaction tube 100 can be prevented, thereby making it possible to stably flow the raw material in the reaction tube.

Embodiment G

This embodiment G of the present invention is a toner prepared by the toner production method of the embodiment E or F mentioned above, which uses one of the reactors of the embodiments A-D. Since the toner is prepared by the toner production method mentioned above, the toner has good hot offset resistance.

Additional modifications and variations of the present invention are possible in light of the above teachings. It is therefore to be understood that within the scope of the appended claims the invention may be practiced other than as specifically described herein.

What is claimed is:

1. A reactor, which heats a slurry raw material including a solid component, comprising:
   a reaction tube, wherein the slurry raw material is continuously fed from an end of the reaction tube relative to a central axial direction of the reaction tube so as to be flown toward another end of the reaction tube to be heated; and
   at least one separator arranged in the reaction tube to separate an inside of the reaction tube into plural compartments,
   wherein the reactor satisfies the following relations:

$$(\tfrac{1}{2}) \cdot D' \leq D \leq D',$$

wherein D represents a diameter of the at least one separator, and D' represents an inner diameter of the reaction tube.

2. The reactor according to claim 1, including plural separators, wherein the plural separators include:
   plural perforated plates serially arranged in the reaction tube to separate the inside of the reaction tube into plural compartments,
   wherein the following relations are satisfied:

$$(\tfrac{1}{2}) \cdot D' \leq D < D', \text{ and } 0.2 \leq S/D' \leq 5.0,$$

wherein D represents a diameter of each of the plural perforated plates, D' represents the inner diameter of the reaction tube, and S represents an interval between any two adjacent perforated plates in the central axial direction of the reaction tube.

3. The reactor according to claim 2, wherein each of the plural perforated plates has a surface, which is slanting so as to satisfy the following relation:

$$t' < t,$$

wherein t represents a thickness of a central portion of the perforated plate, and t' represents a thickness of an outer edge portion of the perforated plate.

4. The reactor according to claim 1, wherein the at least one separator includes:
   at least one helical plate including:
      a rightward twisted plate; and
      a leftward twisted plate,
   wherein the rightward twisted plate and the leftward twisted plate are serially arranged in the reaction tube while displaced from each other at an angle of 90°, and wherein the following relation is satisfied:

$$(\tfrac{1}{2}) \cdot D' \leq L \leq D',$$

wherein L represents a length of each of the rightward twisted plate and the leftward twisted plate in a direction perpendicular to a raw material flowing direction, and D' represents the inner diameter of the reaction tube.

5. The reactor according to claim 4, wherein the following relation is satisfied:

$$L' > 1.5L,$$

wherein L represents the length of each of the rightward twisted plate and the leftward twisted plate in the direction perpendicular to the raw material flowing direction, and L' represents a length of each of the rightward twisted plate and the leftward twisted plate in the raw material flowing direction.

6. The reactor according to claim 4, including plural helical plates, wherein the following relation is satisfied:

$$0.2 \leq S/D' \leq 5.0,$$

wherein D' represents the inner diameter of the reaction tube, and S represents an interval between any two adjacent helical plates in the central axial direction of the reaction tube.

7. The reactor according to claim 1, including plural separators, wherein the plural separators include:
   at least one perforated plate; and
   at least one helical plate including:
      a rightward twisted plate; and
      a leftward twisted plate,
   wherein the rightward twisted plate and the leftward twisted plate are serially arranged in the reaction tube while displaced from each other at an angle of 90°, and the at least one perforated plate and the at least one helical plate are serially arranged in the reaction tube, wherein the following relations are satisfied:

$$(\tfrac{1}{2}) \cdot D' \leq D < D', (\tfrac{1}{2}) \cdot D' \leq L \leq D', \text{ and } 0.2 \leq S/D' \leq 5.0,$$

wherein D represents a diameter of the at least one perforated plate, D' represents the inner diameter of the reaction tube, L represents a length of each of the rightward twisted plate and the leftward twisted plate in a direction perpendicular to a raw material flowing direction, and S represents an interval between any two adjacent separators in the central axial direction of the reaction tube.

8. A toner production method for producing toner particles, comprising:
   dissolving or dispersing a toner component including at least a binder resin component, which includes a compound having an active hydrogen group, and a polymer having a functional group reactive with the active hydrogen group, in an organic solvent to prepare a first liquid;
   emulsifying or dispersing the first liquid in an aqueous medium to prepare a second liquid;
   partially or completely removing the organic solvent from the second liquid to prepare a modified second liquid; and heating the modified second liquid by feeding the modified second liquid through the reactor according to claim 1 to prepare a third liquid including the toner particles including a binder resin.

9. The toner production method according to claim 8, wherein the method satisfies the following relation:

$$[|d-d'|/d] \times 100 \leq 1,$$

wherein d represents a density of the modified second liquid, and d' represents a density of the third liquid.

* * * * *